Aug. 3, 1943.  W. B. OSBORNE  2,325,873
TRANSMISSION SYNCHRONIZER
Filed June 1, 1942
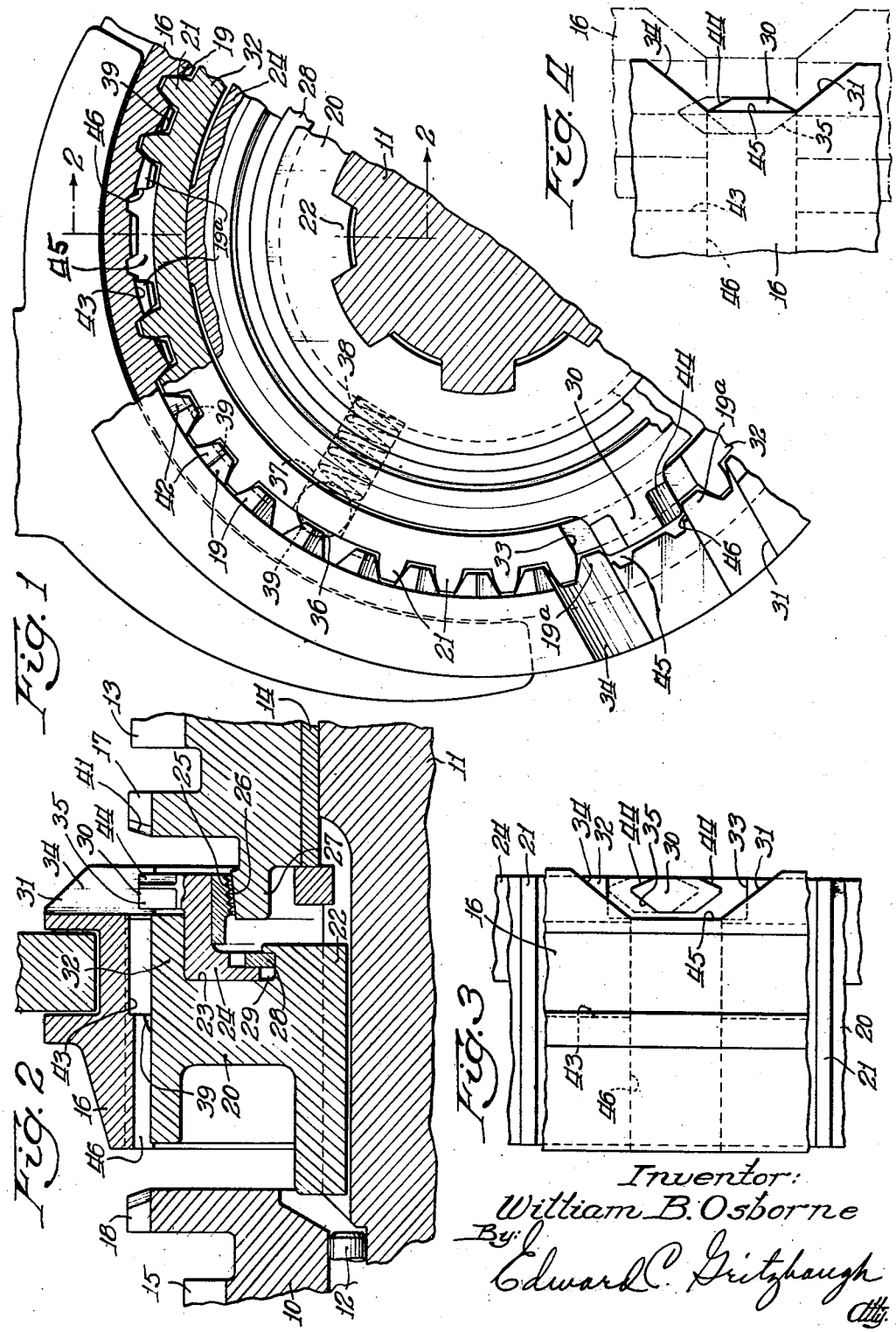
Inventor:
William B. Osborne
By Edward C. Fitzhugh
Atty.

Patented Aug. 3, 1943

2,325,873

UNITED STATES PATENT OFFICE 2,325,873

TRANSMISSION SYNCHRONIZER

William B. Osborne, Muncie, Ind., assignor to Borg-Warner Corporation, Chicago, Ill., a corporation of Illinois Application June 1, 1942, Serial No. 445,333

8 Claims. (Cl. 192—53)

This invention relates to transmission synchronizers of the type in which a jaw clutch sleeve is drivingly mounted on one of a pair of torque transmitting members to be synchronized and is axially shiftable thereon into clutching engagement with a positive clutch element carried by the other of said members, synchronizing means being interposed between the sleeve and the other member and urged into synchronizing engagement with the latter through the medium of blocking means which prevents the completion of the shift until synchronism has been established between said torque transmitting members.

In the synchronizer with which the present invention deals particularly, the blocking means is in the form of approximately three or more lugs formed on the ring and adapted, in non-blocking position, to be received in recesses or passes in the clutch sleeve, so as to permit the sleeve to advance to clutching position. In the past, considerable difficulty has been experienced with this type of synchronizer, in that the alignment of the blocker lugs with the slots, and the consequent movement of the sleeve into engagement with the jaw clutch teeth of the coacting clutch element would usually occur at an instant when the jaw clutch teeth were not in registry with the spaces between the teeth of the sleeve. Chamfers were provided on the engaging ends of the teeth of the sleeve and jaw clutch element respectively so that the axial pressure of the sleeve teeth against the coacting jaw clutch teeth would tend to rotate the parts relative to each other until the proper alignment had been achieved. However, such rotation was resisted by the gripping engagement between the friction surfaces of the synchronizer ring and the coacting cone, and in order to effect the alignment of the clutching teeth, it was necessary to break the grip of the friction surfaces.

The object of the present invention is to provide, in a synchronizer of the type discussed above, an arrangement permitting the jaw clutch teeth to be properly aligned without disengaging the friction surfaces.

These and other objects and features of the invention will become apparent from the following detailed description when taken together with the accompanying drawing in which:

Fig. 1 is a transverse sectional view of a portion of a synchronizer embodying the invention.

Fig. 2 is an axial sectional view of the same, taken on the line 2—2 of Fig. 1.

Fig. 3 is a detail plan view of interior parts of the synchronizer, the blocker ring being shown in non-blocking position.

Fig. 4 is a similar view showing the blocker ring in an advanced stage of movement of the shiftable jaw clutch sleeve.

As an example of one form in which the invention may be embodied, I have shown in the drawing a portion of a synchronizer embodied in a transmission having a drive shaft 10, a driven shaft 11 piloted as at 12 in the rear end of the drive shaft 10, and a gear 13 journalled through the medium of a bearing bushing 14 on the driven shaft 11 and adapted to receive drive from a countershaft gear cluster (not shown) which in turn is driven from a gear 15 on the drive shaft 10.

The shaft 11 is adapted to receive a reduced ratio drive from the countershaft driven gear 13 through the medium of a jaw clutch sleeve 16 which is shiftable into engagement with positive clutch teeth 17 formed on the gear 13. A direct drive from the drive shaft 10 to the driven shaft 11 may be established by shifting the sleeve 16 into engagement with clutch teeth 18 formed on the drive shaft 10. The sleeve 16 has internal teeth 19 which are adapted to mesh with either the teeth 17 or the teeth 18.

The sleeve 16 is mounted upon a hub 20, the teeth 19 being meshed with external teeth 21 on the hub 20, whereby the sleeve is drivingly connected to the hub and yet may be shifted axially so as to establish clutching connection with the teeth 17 or the teeth 18. The hub 20 in turn is splined as at 22 upon the driven shaft 11 and thereby drivingly connected thereto while being free to shift axially sufficiently to establish the synchronizing action which will hereinafter be described.

Mounted in an axially opening annular depression 23 in the hub 20 is a synchronizer ring 24 having an internal, threaded, conical friction face 25 adapted to coact with an external conical friction face 26 on a friction cone 27 formed integrally with the second speed gear 13. The synchronizer ring 24 is retained in the recess 23 by a retainer ring 28 confined in an annular recess 29 in the hub 20. The ring 28 retains the synchronizer ring 24 in axially fixed relation to the hub 20 but permits it to oscillate relative to the hub. Formed on the blocker ring 24 are three or more blocker lugs 30 extending radially outwardly beyond the periphery of the inner extremities of the sleeve teeth 19.

In the rim 32 of the hub 20, defining the periphery of the recess 23, are formed a plurality of notches 33. The blocker lugs 30 extend through the notches 33 and thence into notches 31 in the end of the sleeve 16. The notches 31 are defined by diverging cam faces 34 the inner extremities of which are formed on pairs of spaced teeth 19a, the latter comprising the blocker portions of the sleeve 16. Each pair of teeth 19a define between them a pass 45 adapted to receive the corresponding lug 30 when the latter is in register therewith (non-blocking position shown in full lines in Fig. 3), whereby to permit the sleeve 16 to advance into clutching engagement with the teeth 17. The notches 33 are wider than the lugs 30 so as to permit the latter to oscillate from the non-blocking position to a position in which one side of each lug 30 blocks the path of axial movement of a tooth 19a. Thus the sleeve 16 will be blocked against movement into clutching engagement with the teeth 17. The lugs 30 will be moved to blocking position on one side or the other of the passes 45 as a result of frictional engagement between the surfaces 25 and 26 transmitting torque to the ring from the cone 27 as long as differential rotation exists.

The lugs 30 are provided with chamfered faces 35 adapted to coact with the cam faces 34 of the notches 31 to urge the lugs back toward non-blocking position as a result of axial pressure exerted by the sleeve 16 as it is urged toward engagement with the teeth 17.

The blocking engagement between the lugs 30 and sleeve 16 serves not only to block the sleeve from movement to clutching position but also serves to transmit, from the sleeve to the synchronizer ring, the necessary axial thrust for tightening the friction surfaces 25 and 26 into synchronizing engagement with each other, whereby the rotation of the members 13 and 20 is synchronized.

I provide a plurality of poppet balls 36 disposed in bores 37 in the hub 20 and urged by coil springs 38 into engagement with notches 39 in the teeth 19 of the sleeve 16. The poppet balls 36 are adapted to transmit from the sleeve 16 to the hub 20 just sufficient thrust to advance the hub until the engagement between the friction faces 25 and 26 is established, thereby causing the blocker lugs 30 to assume their blocking position.

Upon the establishment of synchronism, the engagement of the friction surfaces will momentarily establish a fixed relation between the blocker lugs and the teeth 17. Under the law of averages, in a majority of instances, the teeth 17 will not be in proper alignment with the spaces between the teeth 19 when the lugs 30 are in their centered, non-blocking positions. It is necessary then in order to establish the proper alignment of the clutch teeth to effect a slight relative rotation between the sleeve 16 and the gear 13. To this end, opposed ends of the teeth 17 and 19 are chamfered as at 41 and 42 respectively so as to develop a circumferential bias from the axial pressure exerted by the sleeve. In earlier synchronizers this circumferential bias had to be sufficient to break the engagement of the surfaces 25 and 26, and some difficulty has been experienced in this stage of operation, the result being a "draggy" feel in the shifting operation.

The present invention overcomes this difficulty by providing in the interior of the sleeve 16 a series of recesses 43 each communicating with a respective pass 45 and extending circumferentially on either side thereof. In axial extent, the recesses 43 begin immediately adjacent the inner extremities of the notches 31 and extend sufficiently toward the other side of the sleeve to accommodate the lugs 30 throughout the movement of the sleeve into clutching engagement with the teeth 17.

As soon as the lugs 30 have passed through the passes 45 in such movement of the sleeve 16, they are permitted to move circumferentially in the recesses 43 so as to enable the synchronizer ring and the clutch teeth 17 to move circumferentially without breaking the grip of the friction surfaces, until the teeth 17 are in proper alignment with the spaces between the teeth 19. The parts are so arranged that such circumferential adjustment occurs prior to the engagement of the teeth 17 by the teeth 19.

The blocker lugs 30 are provided with chamfered faces 44 on the outer side thereof, adapted when the sleeve 16 is retracted from the teeth 17 to guide the lugs 30 back through the passes 45.

In order to form the passes, axially extending slots 46 are milled in the interior of the sleeve 16, removing some of the teeth 19.

A convenient method of forming the recess 43 is to mill it with a cutter having a diameter smaller than the interior diameter of the sleeve, so that the recess is arcuate with the circumferential extremities thereof terminating in normal surfaces of the teeth 19.

While I have described my invention in connection with one specific embodiment thereof, it is to be understood that this is by way of illustration and not by way of limitation, and the scope of my invention is defined solely by the appended claims which should be construed as broadly as the prior art will permit.

I claim:

1. A transmission synchronizer comprising driving and driven members, one of said members having clutch teeth and a friction clutch element, a clutch sleeve mounted on, drivingly connected to and axially shiftable on the other of said members and having teeth for engagement with said clutch teeth, a synchronizer element having a friction surface for coaction with said friction element, and including a blocker portion adapted to have limited circumferential movement relative to said sleeve, said sleeve having a projecting portion adapted to engage said blocker portion in one position of said circumferential movement and defining one side of a pass adapted to receive said blocker portion as the sleeve moves toward clutching engagement with said clutch teeth, said sleeve having a recess extending circumferentially from said pass, in which said blocker portion may move circumferentially from said pass in order to permit said sleeve and clutch teeth to become properly aligned for clutching engagement without breaking the engagement between the said friction surface and friction element.

2. In a transmission synchronizer, driving and driven members, one of said members having clutch teeth and a friction clutch element, a clutch sleeve drivingly connected to and axially shiftable on the other of said members and having teeth for meshing engagement with said clutch teeth, said sleeve having a pair of blocker portions spaced circumferentially to define a pass, a synchronizer element having a friction face for coaction with said friction element and including a blocker element, said synchronizer element being adapted to have limited circumferential movement relative to said sleeve from a position in which it is adapted to be engaged by one of said sleeve blocker portions to block the movement of said sleeve to clutching engagement with said clutch teeth, to a position in which it is adapted to enter said pass so as to permit the sleeve to advance to clutching position, said sleeve being provided, interiorly of said blocking portions, with a recess extending circumferentially from and communicating with said pass, in which said blocker element may move circumferentially after having moved through said pass, whereby to permit said clutch teeth and sleeve teeth to properly align themselves for clutching engagement without breaking the grip of said friction surfaces.

3. A transmission synchronizer as defined in the preceding claim, wherein said sleeve blocker portions are provided with inclined camming faces adapted to guide said blocker element into said pass in response to axial pressure of the sleeve against said blocker element.

4. A transmission synchronizer as defined in the second preceding claim, wherein said blocker element has chamfered faces adapted to coact with the inner extremities of said sleeve blocker portions so as to guide said blocker elements back into said pass from said recess under axial pressure of said sleeve in the direction of disengagement of said teeth.

5. In a transmission synchronizer, a driving member having clutch teeth and a friction clutch element, a driven shaft, a hub drivingly mounted on said shaft, said hub having a toothed periphery, a clutch sleeve having internal teeth meshing with said toothed periphery of the hub and slidable thereon into engagement with said clutch teeth, said sleeve having a pair of blocker portions circumferentially spaced to define a pass, a synchronizer element mounted on said hub for limited circumferential movement, having a radially outwardly extending blocker element adapted in one position of said circumferential movement to block the path of axial movement of one of said sleeve blocker portions and in another position of said circumferential movement to enter said pass so as to permit the sleeve to advance to clutching engagement with said clutch teeth, said sleeve having, interiorly of said blocker portions, a recess extending circumferentially from and communicating with said pass and adapted, when said lug has passed through said pass, to receive the lug and permit limited circumferential movement thereof so as to allow said sleeve teeth and clutch teeth to properly align themselves without breaking the engagement of said friction surface and friction elements.

6. A transmission synchronizer as defined in the preceding claim wherein said hub is provided with an annular recess and wherein said synchronizer element is in the form of a ring having a portion journalled in said recess, said synchronizer including a snap ring confined in said recess and in turn confining said ring in said recess.

7. A transmission synchronizer as defined in the second preceding claim, wherein said hub has a rim defining an annular recess, wherein said synchronizer element is in the form of a ring having a portion journalled in said recess, and wherein said rim is provided with an axially opening notch through which said blocker element extends radially outwardly, contact of the circumferential extremities of said lug with the extremities of said rim defining said notch serving to limit said circumferential movement.

8. A transmission synchronizer as defined in claim 2, wherein said recess is arcuate.

WILLIAM B. OSBORNE.